US010178594B1

(12) United States Patent
Liu et al.

(10) Patent No.: US 10,178,594 B1
(45) Date of Patent: Jan. 8, 2019

(54) DONOR ACCESS NODE SELECTION FOR RELAYS

(71) Applicant: Sprint Spectrum LP, Overland Park, KS (US)

(72) Inventors: Chunmei Liu, Great Falls, VA (US); Krishna Sitaram, Chantilly, VA (US); Hemanth Pawar, Brambleton, VA (US); Pratik Kothari, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 167 days.

(21) Appl. No.: 15/015,490

(22) Filed: Feb. 4, 2016

(51) Int. Cl.

| | |
|---|---|
| ***H04W 36/16*** | (2009.01) |
| ***H04W 36/08*** | (2009.01) |
| ***H04W 36/00*** | (2009.01) |
| ***H04B 7/155*** | (2006.01) |

(52) U.S. Cl.
CPC ...... *H04W 36/165* (2013.01); *H04B 7/15507* (2013.01); *H04W 36/0072* (2013.01); *H04W 36/08* (2013.01)

(58) Field of Classification Search
CPC . H04W 36/16; H04W 36/08; H04W 36/0072; H04B 7/15507
See application file for complete search history.

(56) References Cited

U.S. PATENT DOCUMENTS

| | | | | |
|---|---|---|---|---|
| 2012/0176958 | A1 | 7/2012 | Queseth et al. | |
| 2013/0172000 | A1* | 7/2013 | Van Phan ............ | H04W 16/26 455/450 |
| 2013/0310052 | A1* | 11/2013 | Timus .............. | H04W 72/0433 455/445 |
| 2017/0164423 | A1* | 6/2017 | Ross .................... | H04W 88/04 |

* cited by examiner

*Primary Examiner* — Jackie Zuniga Abad

(57) ABSTRACT

A relay wireless device is subject to a handoff procedure based on a signal strength and other features of a plurality of neighbor access nodes that are within range of the relay wireless device, and based on their ability to provide services to end-user wireless devices via the relay wireless device. A first access node obtains a plurality of features of the neighbor access nodes to enable determination of an optimal donor access node to provide services to the end-user devices via the relay wireless device. The first access node may obtain the features directly from each neighbor access node or by communicating with an EMS server. The features of the neighbor access nodes include loading information for each node. The loading information may be matched to the requirements of the relay wireless device.

18 Claims, 7 Drawing Sheets

130
110
120
TRANSMIT RELAY STATUS
201
202
REQUEST FEATURES
RETURN FEATURES
203
204
REQUEST MEASUREMENTS
205
PERFORM MEASUREMENTS
TRANSMIT MEASUREMENTS
206
207
HANDOVER DECISION
208
REQUEST HANDOVER
HANDOVER ACK
209
210
HANDOVER COMMAND
HANDOVER CONFIRMATION
211

DONOR ACCESS NODE SELECTION FOR RELAYS

TECHNICAL BACKGROUND

As wireless networks evolve and grow, there are ongoing challenges in providing high-quality service to increasing numbers wireless devices or user equipment (UE) in various coverage areas of a wireless network. One approach to improving service quality and coverage is to designate a wireless device as a relay node, or "relay wireless device," for relaying communication between a base station or donor access node, and an end-user wireless device. Relay wireless devices may be used at the edge of a coverage area of a donor access node to improve coverage and/or service, as well as in crowded areas having a high number of end-user wireless devices to increase the available throughput to the end-user wireless devices being relayed. However, relay wireless devices may be limited in their ability to effectively service end-user wireless devices that are attached to it, particularly if the resources are limited from the donor access node providing the service.

OVERVIEW

Exemplary embodiments described herein include systems, methods, and nodes for access node selection for a relay wireless device. A method for access node selection in a wireless network includes receiving, at an access node, an indication of a relay status from a wireless device, the indication of relay status comprising at least one usage requirement from the wireless device. The method identifies one or more neighboring access nodes that can satisfy the at least one usage requirement. The access node can be included in said one or more neighboring access nodes. The method further determines a donor access node from the one or more neighboring access nodes based on a comparison of a plurality of features of each of said one or more neighboring access nodes, and performs a handover of the wireless device to the donor access node.

A system for access node selection in a wireless network includes an access node in wireless communication with at least one wireless device, and a processor communicatively coupled to the access node. The processor configures the access node to execute operations including determining an optimal donor access node from among a plurality of candidate donor access nodes for offering service to the wireless device, and performing a handover of the wireless device. The wireless device acts as a relay for relaying services from the optimal donor access node to a plurality of end-user wireless devices.

A relay access node in a wireless network includes a processor for enabling the relay access node to perform operations including transmitting a request indicating a relay status to a first candidate donor access node from among a plurality of candidate donor access nodes. The request includes a usage requirement of a plurality of end-user wireless devices requesting relayed services from the relay access node. The operations include receiving an instruction from the first candidate donor access node to measure signal characteristics of each of the plurality of candidate donor access nodes, and transmitting the measured signal characteristics of at least one of each of the plurality of candidate donor access nodes to the first candidate donor access node. The first candidate donor access node performs a handover of the relay access node based on the measured signal characteristics and the at least one usage requirement.

DETAILED DESCRIPTION

In embodiments disclosed herein, a relay wireless device is subject to a handoff procedure, based on a signal strength and other characteristics or features of a plurality of neighbor access nodes that are within range of the relay wireless device, and based on their ability to provide services to end-user wireless devices via the relay wireless device. A relay wireless device identifies itself to one of a plurality of access nodes that is selected based on one or more signal conditions measured at the relay wireless device. The one access node retrieves or otherwise obtains a plurality of features of the neighbor access nodes to determine an optimal donor access node to provide services to the end-user devices via the relay wireless device. The one access node may further instruct the relay wireless device to perform signal measurements of a plurality of candidate donor access nodes from among the neighbor access nodes. The one access node may further obtain features of the neighbor access nodes directly from each neighbor access node, or by communicating with a network server or controller node, such as an Element Management System (EMS) within a Long-Term Evolution (LTE) network. Based on the information a handover decision is made. In some embodiments, the features of the neighbor access nodes include loading information for each node. The loading information may be specific to a time of day, and averaged over a plurality of days, to account for changing conditions at each access node, since each candidate donor access node also serves other end-user wireless devices directly and in addition to the devices connected via the relay access node. Further, the handover decision may be based on a comparison of the loading and throughput information for each access node with a requirement of the relay wireless device and the end-user wireless devices connected thereto. Automatic handovers may be performed based on based on matching locally-stored and stored time-averaged loading and throughput information with requirements of each request from a relay wireless device. These and additional operations are further described with respect to the embodiments depicted in FIGS. 1-5 below.

Figure 1:
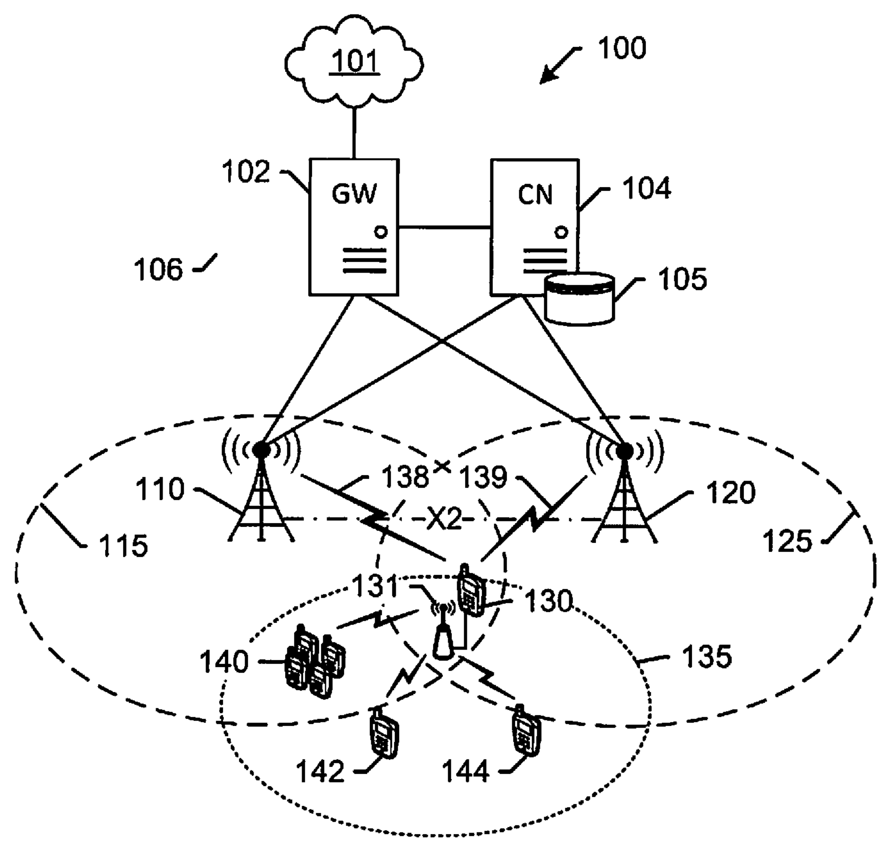
FIG. 1 depicts an exemplary system for donor access node selection.

FIG. 1 depicts an exemplary system 100 for donor access node selection. System 100 comprises a communication network 101, gateway 102, controller node 104, access nodes 110 and 120, relay wireless device 130, and end-user wireless devices 140, 142, and 144. In this embodiment, relay wireless device 130 relays services from one of access nodes 110, 120, to end-user wireless devices 140, 142, 144. To achieve this, relay wireless device 130 may be communicatively coupled to a mini-macro access node 131. Mini-macro access node 131 acts as a wireless access point for wireless devices 140, 142, 144. Access node 110 is illustrated as having coverage area 115, and access node 120 is illustrated as having coverage area 125. Relay wireless device 130 is located within both coverage areas 115 and 120 and, consequently, is able to communicate with both access nodes 110 and 120 via wireless connections 138 and 139, respectively (also referred to as "backhaul connections" for relay wireless device 130). Cluster of wireless devices 140 is located within coverage area 115, and wireless devices 142 and 144 are located outside either coverage area 115, 125, but within coverage area 135 of mini-macro access node 131. As a consequence, cluster of wireless devices 140 may access network services using the combination of relay wireless device 130 and mini-macro access node 131, rather than overload access node 110. Moreover, wireless devices 142 and 144 that are outside ranges 115, 125 may access network services by virtue of being connected to relay wireless device 130 via mini-macro access node 131.

In operation, upon indicating to one of neighbor access nodes 110, 120 that it is operating as a relay, relay wireless device 130 may be subject to a handover procedure based on a signal strength and other characteristics or features of neighbor access nodes 110, 120. For example, relay wireless device 130 may select one access node to identify itself, such as access node 110, based on one or more signal conditions measured at relay wireless device 130. In some embodiments, relay wireless device 130 can request to send a buffer status report to access node 110. Access node 110 can grant this request in a conventional manner. Relay wireless device 130 may respond to the grant by sending a short buffer status report. This short buffer status report is associated with a logical channel group that indicates the buffer status report is communicating the status of wireless device 130 as a relay, and thus is not asking for additional resource allocations (like a 'conventional' buffer status report would indicate). In other words, access node 110 is configured such that when a wireless device responds with a buffer status report for the 'special' logical channel group, it means that the buffer status report is not actually reporting the status of a buffer. Rather, this buffer status report indicates that wireless device 130 is now functioning as a relay. Further, the buffer status report and any additional indicator of a relay status may include a requirement for the relay wireless device to function as a relay, such as a minimum throughput, frequency band, etc.

In response to this indication, access node 110 begins to obtain information that is helpful in making a handover decision. For example, access node 110 obtains a plurality of features of the neighbor access nodes, such as access node 120, to enable a determination of an optimal donor access node to provide services to end-user devices 140, 142, 144 via relay wireless device 130 and mini-macro access node 131. Access node 110 may further instruct relay wireless device 130 to perform measurements of signals transmitted from access nodes 110, 120 and use the measurements to enable the determination of the optimal access node. Access node 110 may further communicate directly with neighbor access node 120 to obtain features of the neighbor access node 120, such as information about an available throughput, a frequency band deployed by neighbor access node 120, an ability to provide carrier-aggregation services, or any other features that can increase the quality of service (QoS) or reliability of the connection with relay wireless device 130. For example, the indication from relay wireless device 130 may include a minimum throughput. The minimum throughput may be based on a number of end-user wireless that are attaching to or expected to be attached to relay wireless device 130. Further, the features requested by access node 110 from neighbor access node 120 can include a load information or throughput for neighbor access node 120 that is specific to a time of day and averaged over a plurality of days. Such information is useful in making a handover decision because it accounts for changing conditions at each access node. The time-related information retrieved from neighbor access node 120 may be stored at access node 110, and used in future handover decisions without having to repeatedly signal neighboring access nodes such as access node 120. Access node 110 can communicate directly with neighbor access node 120 via, for instance, an X2 connection, or any other direct connection between access nodes or base stations that are part of the same network.

In some embodiments, access node 110 retrieves feature information for its neighbor access nodes by communicating with a network server, such as controller node 104, which may further comprise an element management system (EMS). An element management system (EMS) typically comprises systems and applications for managing network elements on a wireless network. In other embodiments, an EMS may be logically placed anywhere else within system 100, including within communication network 101. In either case, the EMS regularly updates and maintains records of load information for all access nodes within the network, and may further maintain records based on time of day and averages over a period of days. In some embodiments, resource block utilization may be used to determine the load. In embodiments where controller node 104 includes the EMS, these records may be stored in database 105 coupled to controller node 104. Access node 110 requests this information from controller node 104 to use in making a handover decision.

In some embodiments, access node 110 may refer to measurements provided by relay wireless device 130, such as measurements of wireless links 138, 139, to determine for which neighbor access nodes to request features from controller node 104. For example, relay wireless device 130 may only be able to communicate with two out of three access nodes within a network, in which case access node 110 only requests information about those access nodes. In other embodiments, feature information for all neighbor access nodes is pushed to access nodes 110, 120 actively by controller node 104 on a regular basis, in order to minimize communication overhead, as further described herein.

Based on the information gathered about neighbor access nodes and their features, a handover decision is made. Access node 110 may perform the handover decision based on whether or not the load and other features or characteristics of neighbor access node 120 match the requirements of relay access node 130 and the end-user wireless devices connected thereto. Access node 110 further uses its own load information and characteristics in a comparison with neighbor access node 120 (and any other access nodes in system 100) to determine the best combination of features for determining an optimal donor access node. For example, an optimal donor access node is selected if it offers a specific throughput, or the highest throughput, or a minimum guaranteed throughput for a specified period of time. The indication of relay status may include a time period during which a specific throughput is requested. Thus, the optimal donor access node would be one that provides at least the specific throughput for at least the period of time. Other factors that enable a determination of an optimal donor access can include a throughput per frequency band deployed by the access node, a number of frequency bands deployed versus other neighbor access nodes, and so on.

In some embodiments, the optimal donor access node is one that can provide relay access node 130 with preferential treatment because it is functioning as a relay. Examples of preferential treatment can include, but are not limited to, increasing a scheduling weight for relay wireless device 130, setting one or more network parameters in order to give traffic associated with relay wireless device 130 better network performance than traffic associated with non-relaying devices, and so on. Network parameters may be configured to provide one or more of higher priority in scheduling resources, improved RF conditions, higher throughput, lower latency, etc. to relay wireless device 130 than are provided to other non-relaying wireless devices, such as end-user wireless devices that directly connect to access node 110.

In either case, the throughput offered by wireless communication links 138, 139 is dynamically changing, and therefore needs to be monitored on an ongoing or periodic basis. In some embodiments, determination of the throughput of connections 138, 189 may include a time average over a period of time, or at the same time each day for a period of days. In some embodiments described herein, the handover decision may be performed at relay wireless device 130, based on information collected at and received from access node 110. In some embodiments, subsequent handover decisions may be performed automatically, based on patterns in the averages collected and stored locally, so as to minimize repeated signaling between network elements.

In an embodiment, relay wireless device 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from a donor access node are amplified and transmitted by relay wireless device 130 to one or more of wireless devices 140, 142, 144. Likewise, RF signals received from wireless devices 140, 142, 144 are amplified and transmitted by relay wireless device 130 to a donor access node, such as one of access nodes 110, 120. Alternatively or in addition, a layer 2 relay device performs a decode and forward (DF) function. RF signals received from the donor access node are demodulated and decoded, then encoded and modulated again before being transmitted by relay wireless device 130 to one or more of wireless devices 140, 142, 144. Likewise, RF signals received from one or more of wireless devices 140, 142, 144 are demodulated and decoded, then encoded and modulated again before being transmitted by relay wireless device 130 to the donor access node. Alternatively or in addition, a layer 3 relay device also performs a decode and forward function. However, a layer 3 relay device also performs additional processing (such as ciphering and/or data concatenation/segmentation/resassembly). In other words, relay wireless device 130 performs demodulation and decoding of the received RF signals (either uplink or downlink), processes received data, then encodes, modulates, and transmits the data to one or more of wireless devices 140, 142, 144.

Wireless devices 130, 140, 142, 144 may be any device, system, combination of devices, or other such communication platform capable of communicating wirelessly with access nodes 110, 120 using one or more frequency bands deployed by access node 110, 120. Wireless devices 130, 140, 142, 144 may include, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 140, 142, 144, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, may include S1 communications links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW)

and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing wireless device information, including which wireless devices are operating as relay wireless devices, such as relay wireless device 130. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110, 120 can be any network node configured to provide communication between wireless devices 130, 140, 142, 144 and communication network 101. Access nodes 110, 120 can be standard access nodes and/or short range, low power, small access nodes. A standard access node can be a macrocell access node such as a base transceiver station, a radio base station, an eNodeB device, or an enhanced eNodeB device, or the like. In an exemplary embodiment, a macrocell access node can have a coverage area 115, 125 in the range of approximately five kilometers to thirty five kilometers and an output power in the tens of watts. A small access node can include a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to obtain information. Access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. For example, the software may include a handover decision module as further described herein. Access nodes 110, 120 can receive instructions and other input at a user interface. Access nodes 110, 120 communicate with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
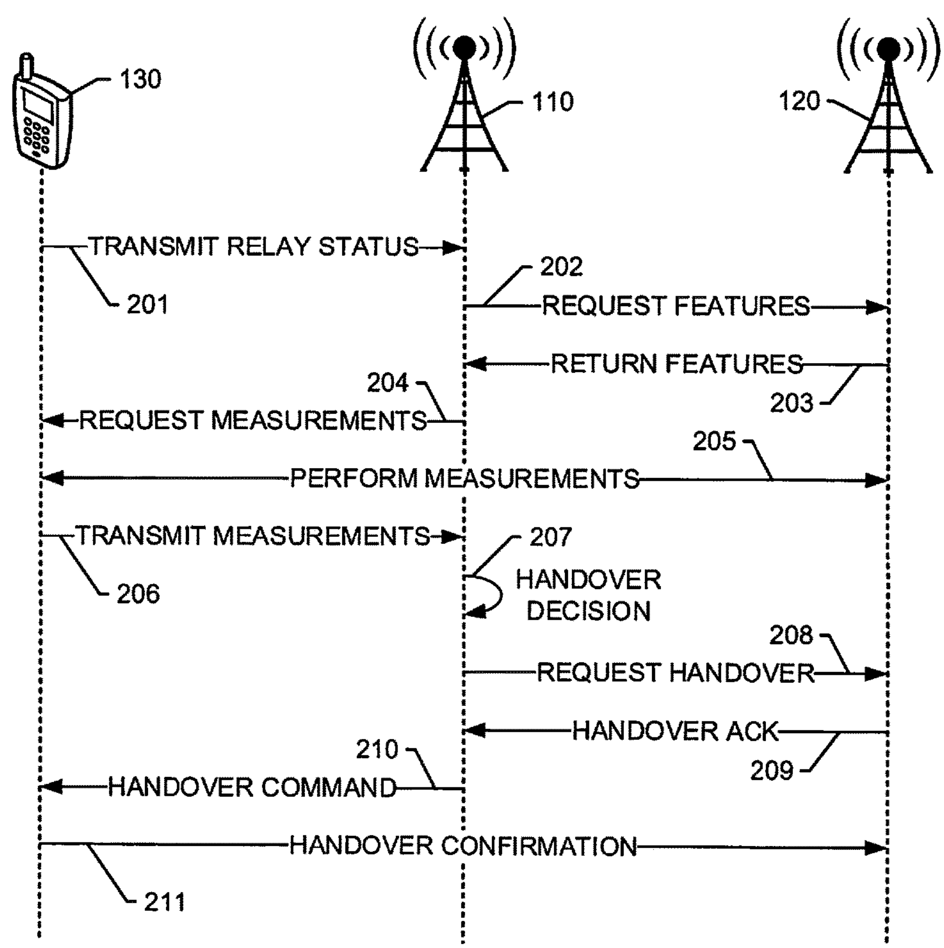
FIG. 2 depicts an exemplary flow for donor access node selection using direct communication between neighbor access nodes.

FIG. 2 depicts an exemplary flow for donor access node selection using direct communication between neighbor access nodes. The flow is generally discussed with reference to elements within system 100. For example, relay wireless device 130 is configured to relay services from one of access nodes 110, 120, to one or more end-user wireless devices that are not shown. Also not shown is a mini-macro access node coupled to relay wireless device 130. In other embodiments, the flow can be implemented with any suitable network element. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In operation, at 201, relay wireless device 130 indicates to access node 110 that it is operating as a relay. Relay wireless device 130 may select access node 110 to identify itself based on one or more signal conditions measured at relay wireless device 130. In some embodiments, relay wireless device 130 can transmit a short buffer status report to access node 110 to indicate its relay status, as further described above. The message 201 may further include a preference or requirement for a donor access node, such as a minimum available throughput, a frequency band, a carrier-aggregation ability, etc. The minimum throughput may be based on a number of end-user wireless that are attaching to or expected to be attached to relay wireless device 130.

In response to this indication, access node 110 begins to obtain information that is helpful in making a handover decision. For example, in 202, access node 110 requests features of the neighbor access node 120, such as information about an available throughput, a frequency band deployed by neighbor access node 120, an ability to provide carrier-aggregation services, or any other features that can increase the quality of service (QoS) or reliability of the connection with relay wireless device 130, in order to enable a determination of an optimal donor access node for relay wireless device. Further, the features requested from neighbor access node can include a load information or throughput for neighbor access node 120 that is specific to a time of day, and averaged over a plurality of days. Such information is useful in making a handover decision because it accounts for changing conditions at each access node. Access node 110 receives a response in 203. The time-related information may be stored at access node 110, and used in future handover decisions without having to repeatedly signal neighboring access nodes such as access node 120. Access node 110 can communicate directly with neighbor access node 120 via, for instance, an X2 connection, or any other direct connection between access nodes or base stations that are part of the same network.

In 204, access node 110 instructs relay wireless device 130 to perform measurements of signals transmitted from access nodes 110, 120 and use the measurements to enable the determination of the optimal access node. In response, relay wireless device 130 performs measurements 205, and transmits the measurements in 206 to access node 110. The measurements may be used for a handover decision in 207. For instance, the measurements may be used in addition to the features and throughput information received from access node 120 for a handover decision 207. In some embodiments, the measurements 204 may be requested from relay wireless device 130 prior to feature request 202. In such embodiments, the measurements received from relay wireless device 130 may be used to determine which neighbor access nodes to request features from. For instance, if relay wireless device 130 receives a low-strength signal from neighbor access node 120, then access node 110 may determine that it is a waste of resources to attempt to request features from neighbor access node 120.

Access node 110 may perform handover decision 207 based on whether or not the load and other features or characteristics of neighbor access node 120 match the requirements of relay access node 130 and the end-user wireless devices connected thereto. Access node 110 further uses its own load information and characteristics in a comparison with neighbor access node 120 (and any other access nodes in system 100) to determine the best combination of features for determining an optimal donor access node. In some embodiments, the optimal donor access node is one that can provide relay access node 130 with preferential treatment because it is functioning as a relay. Examples of preferential treatment can include, but are not limited to, increasing a scheduling weight for relay wireless device 130, setting one or more network parameters in order to give traffic associated with relay wireless device 130 better network performance than traffic associated with non-relaying devices, and so on. Network parameters may be configured to provide one or more of higher priority in scheduling resources, improved RF conditions, higher throughput, lower latency, etc. to relay wireless device 130 than are provided to other non-relaying wireless devices, such as end-user wireless devices that directly connect to access node 110.

If decision 207 results in a determination that neighbor access node 120 is the optimal access node, then access node 110 requests a handover of relay wireless device 130 to access node 120 in 208. This is a standard handover procedure, and neighbor access node 120 responds with an acknowledgement 209. In 210, access node 110 transmits handover parameters in a handover command to relay wireless device 130, and relay wireless device 130 confirms the handover with now optimal donor access node 120.

Figure 3:
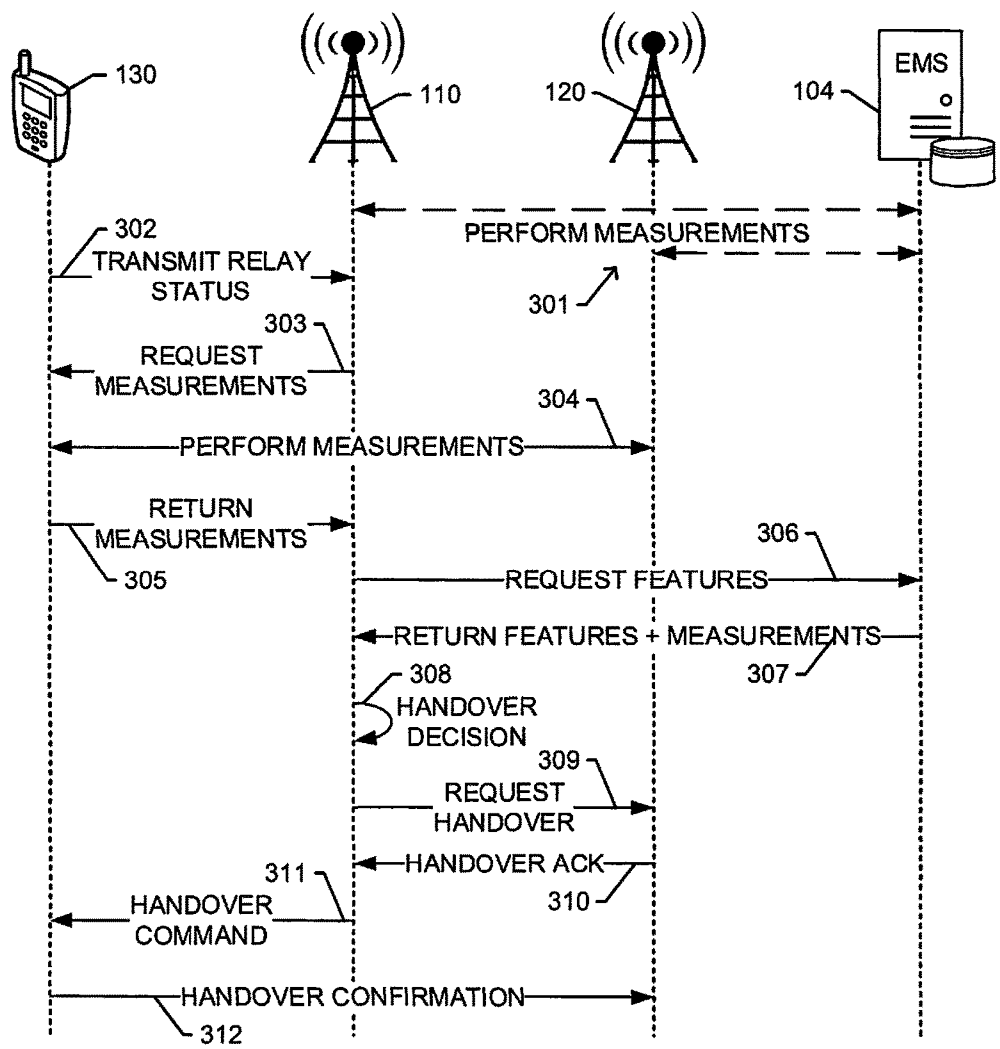
FIG. 3 depicts an exemplary flow for donor access node selection using pull communication with an element management system (EMS) server.

FIG. 3 depicts an exemplary flow for donor access node selection using pull communication with an element management system (EMS) server 104. The flow is generally discussed with reference to elements within system 100. For example, relay wireless device 130 is configured to relay services from one of access nodes 110, 120, to end-user wireless devices (not shown). Also not shown is a mini-macro access node coupled to relay wireless device 130. In other embodiments, the flow can be implemented with any suitable network element. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

As described herein, in some embodiments, access node 110 retrieves feature information for its neighbor access nodes by communicating with a network server, such as EMS server 104. EMS server 104 typically comprises systems and applications for managing network elements on a wireless network. EMS server 104 regularly updates and maintains records of load information for all access nodes within the network, and may further maintain records based on time of day and averages over a period of days. For example, in 301, EMS server 104 may request measurements of load and other feature determinations of each of access nodes 110, 120, and other access nodes in the network, and record them on an internal database. The measurements may be performed by the access node itself, or any other network entity in communication with the access node. In some embodiments, resource block utilization may be used to determine the load. In this and other embodiments, the measurement operations performed by EMS server 104 occur on an ongoing basis, or at specific times, and may be averaged over a period of time.

At a subsequent time, in 302, relay wireless device 130 indicates to access node 110 that it is operating as a relay. Relay wireless device 130 may select access node 110 to identify itself based on one or more signal conditions measured at relay wireless device 130. In some embodiments, relay wireless device 130 can transmit a short buffer status report to access node 110 to indicate its relay status, as further described above. The message 302 may further include a preference or requirement for a donor access node, such as a minimum available throughput, a frequency band, a carrier-aggregation ability, etc. The minimum throughput may be based on a number of end-user wireless that are attaching to or expected to be attached to relay wireless device 130.

In response to this indication, access node 110 begins to obtain information that is helpful in making a handover decision. In some embodiments, in response to the request, access node 110 may request the feature information for neighbor access nodes from EMS server 104 to use in making a handover decision. However, prior to this step, access node 110 may refer to measurements provided by relay wireless device 130 to determine which neighbor access node is a candidate donor access node. For example, in 303, access node 110 instructs relay wireless device 130 to perform measurements of signals transmitted from access nodes 110, 120 and use the measurements to enable the determination of the optimal access node, or at least to narrow the selection of candidate donor access nodes prior to requesting features of the neighbor access nodes. In response, relay wireless device 130 performs measurements 304, and transmits the measurements in 305 to access node 110. The measurements may be any signal strength or quality measurements, such as a signal-to-interference noise ratio (SINR), etc. The measurements received from relay wireless device 130 may be used to determine which neighbor access nodes to identify in a feature request message 306 to EMS server 104. For example, relay wireless device 130 may only be able to communicate with two out of three access nodes within a network, in which case access node 110 only requests information about those access nodes. If relay wireless device 130 receives a low-strength signal from neighbor access node 120, then access node 110 may determine that it is a waste of resources to attempt to request features of neighbor access node 120.

In 306, access node 110 requests features of the neighbor access node 120 from EMS server 104. The features along with measurements recorded in 301 are returned in 307 to access node 110. The features can include information about an available throughput, a frequency band deployed by neighbor access node 120, an ability to provide carrier-aggregation services, or any other features that can increase the quality of service (QoS) or reliability of the connection with relay wireless device 130. Further, the features can include a load information or throughput for neighbor access node 120 that is specific to a time of day, and averaged over a plurality of days. Such information is useful in making a handover decision because it accounts for changing conditions at each access node. The time-related information may be stored within a database of EMS server 104. Access node 110 can communicate with EMS server 104 via, for instance, an S1 connection, or any other connection between access node 110 and other network elements.

Access node 110 may perform handover decision 308 based on whether or not the load and other features or characteristics of neighbor access node 120 match the requirements of relay access node 130 and the end-user wireless devices connected thereto. Access node 110 further uses its own load information and characteristics in a comparison with neighbor access node 120 (and any other access nodes in system 100) to determine the best combination of features for determining an optimal donor access node. In some embodiments, the optimal donor access node is one that can provide relay access node 130 with preferential treatment because it is functioning as a relay. Examples of preferential treatment can include, but are not limited to, increasing a scheduling weight for relay wireless device 130, setting one or more network parameters in order to give traffic associated with relay wireless device 130 better network performance than traffic associated with non-relaying devices, and so on. Network parameters may be configured to provide one or more of higher priority in scheduling resources, improved RF conditions, higher throughput, lower latency, etc. to relay wireless device 130 than are provided to other non-relaying wireless devices, such as end-user wireless devices that directly connect to access node 110.

If decision 308 results in a determination that neighbor access node 120 is the optimal access node, then access node 110 requests a handover of relay wireless device 130 to access node 120 in 309. This is a standard handover procedure, and neighbor access node 120 responds with an acknowledgement 310. In 311, access node 110 transmits handover parameters in a handover command to relay wireless device 130, and relay wireless device 130 confirms the handover with now optimal donor access node 120 with handover confirmation 312. Further, in some embodiments, subsequent handover decisions may be performed automatically, based on patterns in the averages collected and stored locally, so as to minimize repeated signaling between network elements.

Figure 4:
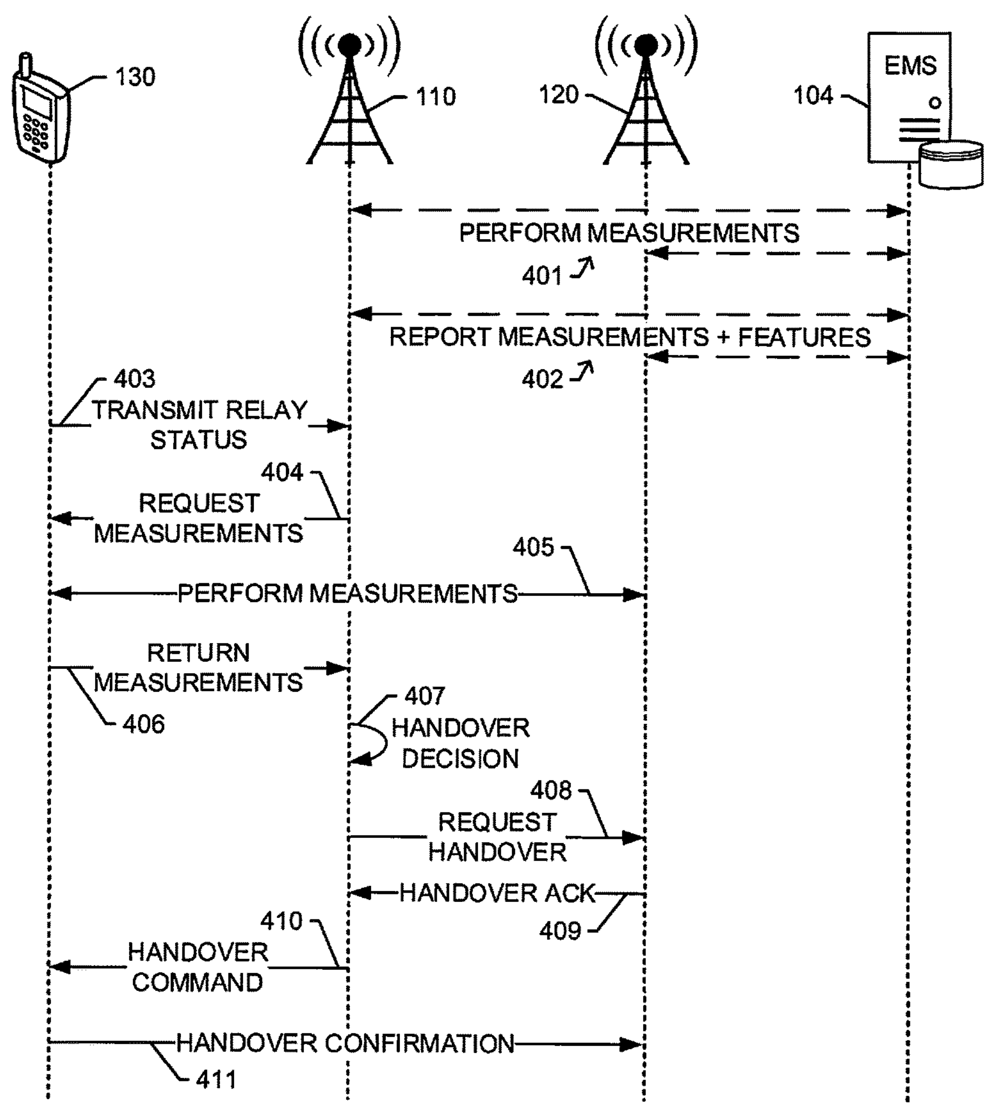
FIG. 4 depicts an exemplary flow for donor access node selection using push communication from an element management system (EMS) server.

FIG. 4 depicts an exemplary flow for donor access node selection using push communication from an element management system (EMS) server. The flow is generally discussed with reference to elements within system 100. For example, relay wireless device 130 is configured to relay services from one of access nodes 110, 120, to end-user wireless devices (not shown). Also not shown is a mini-macro access node coupled to relay wireless device 130. In other embodiments, the flow can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In this embodiment, feature information for all neighbor access nodes is pushed to access nodes 110, 120 actively by EMS server 104 on a regular basis, in order to minimize communication overhead, as further described herein. EMS server 104 typically comprises systems and applications for managing network elements on a wireless network. EMS server 104 regularly updates and maintains records of load information for all access nodes within the network, and may further maintain records based on time of day and averages over a period of days. For example, in 401, EMS server 104 may request measurements of load and other feature determinations of each of access nodes 110, 120, and other access nodes in the network, and record them on an internal database. The measurements may be performed by the access node itself, or any other network entity in communication with the access node. In some embodiments, resource block utilization may be used to determine the load. In this and other embodiments, the measurement operations performed by EMS server 104 occur on an ongoing basis. Further, in 402, EMS server 104 reports or transmits the measurements and features for all access nodes in the network, to each access node 110, 120 in the network. This enables each access node to make an educated determination for handover based on the latest available information. Moreover, periodically pushing this information 402 to each access node 110, 120 eliminates the need for repeated information requests from access nodes, particularly in times of high handover rates, thereby minimizing unnecessary signaling within the network.

At a subsequent time, in 403, relay wireless device 130 indicates to access node 110 that it is operating as a relay. Relay wireless device 130 may select access node 110 to identify itself based on one or more signal conditions measured at relay wireless device 130. In some embodiments, relay wireless device 130 can transmit a short buffer status report to access node 110 to indicate its relay status, as further described above. The message 403 may further include a preference or requirement for a donor access node, such as a minimum available throughput, a frequency band, a carrier-aggregation ability, etc. The minimum throughput may be based on a number of end-user wireless that are attaching to or expected to be attached to relay wireless device 130.

In response to this indication, access node 110 transmits a request 404 to relay wireless device 130 to perform measurements of signals transmitted from access nodes 110,

120 and use the measurements to enable the determination of the optimal access node. In response, relay wireless device 130 performs measurements 405, and transmits the measurements in 406 to access node 110. The measurements received from relay wireless device 130 may be used to perform a handover decision, in conjunction with the feature information received from EMS server 104 in step 403. The features can include information about an available throughput, a frequency band deployed by neighbor access node 120, an ability to provide carrier-aggregation services, or any other features that can increase the quality of service (QoS) or reliability of the connection with relay wireless device 130. Further, the features can include a load information or throughput for neighbor access node 120 that is specific to a time of day and averaged over a plurality of days. Such information is useful in making a handover decision 407 because it accounts for changing conditions at each access node.

Access node 110 may perform handover decision 407 based on whether or not the load and other features or characteristics of neighbor access node 120 match the requirements of relay access node 130 and the end-user wireless devices connected thereto. Access node 110 further uses its own load information and characteristics in a comparison with neighbor access node 120 (and any other access nodes in system 100) to determine the best combination of features for determining an optimal donor access node. In some embodiments, the optimal donor access node is one that can provide relay access node 130 with preferential treatment because it is functioning as a relay, as further described above. If decision 407 results in a determination that neighbor access node 120 is the optimal access node, then access node 110 requests a handover of relay wireless device 130 to access node 120 in 408. This is a standard handover procedure, and neighbor access node 120 responds with an acknowledgement 409. In 410, access node 110 transmits handover parameters in a handover command to relay wireless device 130, and relay wireless device 130 confirms the handover with now optimal donor access node 120 with handover confirmation 411.

Figure 5:
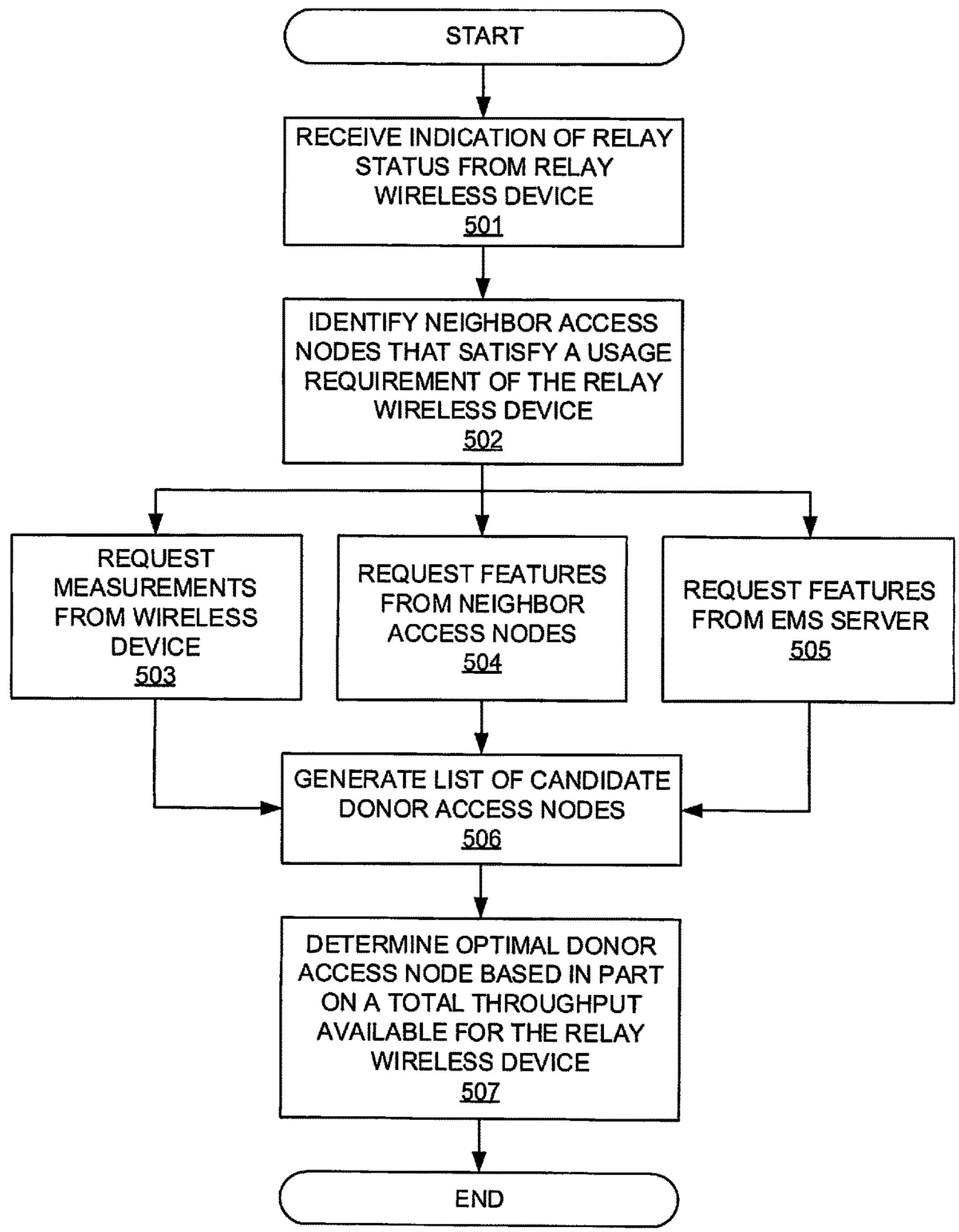
FIG. 5 depicts an exemplary method for donor access node selection at an access node.

FIG. 5 depicts a method for donor access node selection at an access node. The method of FIG. 5 is generally discussed with reference to elements within system 100, such as one of access nodes 110, 120. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In 501, an access node receives an indication from a relay wireless device that identifies specific requirements for optimized relaying services. The indication may be received at an access node that is selected by the relay wireless device based on one or more signal conditions measured at the relay wireless device. In response, the access node may identify in step 502 a plurality of neighbor access nodes that satisfy the specific requirements of the relay wireless device. The identification 502 may be based on prior knowledge of neighbor access nodes. The access node may instruct the relay wireless device in 503 to perform signal measurements of one or more of the plurality of neighbor access nodes. The signal measurements can be A4 measurements, and can include a configurable measurement threshold. If a measurement meets the configurable threshold, the measurement may be reported to the access node. The threshold may be based on a backhaul throughput or link capacity requirement of the relay wireless device. In parallel, or at any time during the method, the access node may further request in 504 a plurality of features from neighbor access nodes. At any time, the access node may request the plurality of features in 505 from an EMS server. Each of these operations has been described herein, and it should be understood that each of these operations may depend on each other. For instance, requesting of features 504 may be dependent on the measurements received in 503, such that only the neighbor access nodes having an acceptable minimum signal strength or quality are submitted in a feature request. Alternately, request of measurements 503 may be based on features retrieved from EMS server in 505.

In either case, based on the available information, a list of candidate donor access nodes is generated in 506. The list of candidate donor access nodes may include all neighbor access nodes that are able to provide services to a relay access node. For instance, the list of candidate donor access nodes may include all access nodes that deploy a specific frequency band required by the relay wireless device, or that offer a specific throughput. In some embodiments, the list of candidate donor access nodes generated in 506 is generated based on the signal measurements 503, and transmitted along with the requesting of features 504 from the EMS. In some embodiments, candidate donor access node list generation 506 is performed early in the method and refined as additional information is input into an optimal donor access node operation, as in step 507 selection of an optimal donor access node. The optimal donor access node may be one that offers a specific throughput, or the highest throughput, or a minimum guaranteed throughput for a specified period of time. For instance, the indication of relay status 501 may include a time period during which a specific throughput is requested. Thus, in 507, the optimal donor access node would be one that provides at least the specific throughput for at least the period of time. Such determinations are enabled by a time-based collection of load data and other features, as performed by the access nodes themselves, or an EMS server as described above. Other factors that enable a determination of an optimal donor access can include a throughput per frequency band deployed by the access node, a number of frequency bands deployed versus other neighbor access nodes, and so on. As in the case of the load information, time-based trends of each of these features may be evaluated, based on the needs of the relay wireless device and its end users attached thereto. Once the optimal candidate donor node is selected, a handover may be performed. In an embodiment where the first access node receiving the indication 501 is the optimal donor access node, no handover is performed. Instead, a connection may be initiated.

In some embodiments, the selection of the optimal access node may be performed at relay wireless device, based on information collected at and received from an access node.

Figure 6:
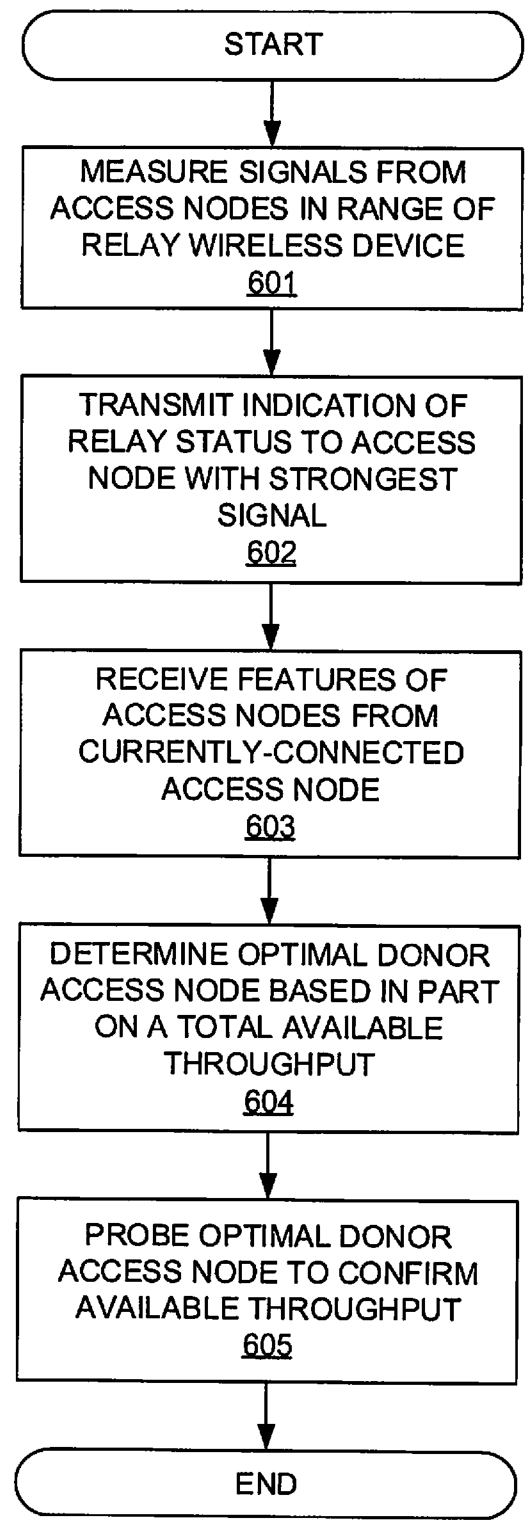
FIG. 6 depicts an exemplary method for donor access node selection at a relay wireless device.

FIG. 6 depicts a method for donor access node selection at a relay wireless device. In other embodiments, the method can be implemented with any suitable network element. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In 601, the relay wireless device performs signal measurements of one or more access nodes within its range, to determine a first access node to submit an indication of its relay status. Selecting the access node with the highest signal strength may preempt the need for handovers in the first place. In 602, an indication is transmitted from the relay wireless device identifying specific requirements for optimized relaying services, such as a minimum throughput, frequency band, etc. In response, the access node may identify a plurality of neighbor access nodes that satisfy the specific requirements of the relay wireless device, or may further request in a plurality of features from neighbor access nodes or an EMS server as further described herein. Optionally, the access node may request additional measurements from the relay wireless device, which the relay wireless device performs and submits to the access node.

In either case, the wireless device receives, in 603, a list of candidate access nodes and their features, based on the information gathered by the access node from its various sources. The list of candidate donor access nodes may include all neighbor access nodes that are able to provide services to a relay access node. For instance, the list of candidate donor access nodes may include all access nodes that deploy a specific frequency band required by the relay wireless device, or that offer a specific throughput. Based on the available information, such as the throughput information, an optimal donor access node is selected in 604. The optimal donor access node may be one that offers a specific throughput, or the highest throughput, or a minimum guaranteed throughput for a specified period of time. For instance, the relay wireless device may require donor services for a specified time period during which a specific throughput is requested. Thus, in 604, the optimal donor access node would be one that provides at least the specific throughput for at least the period of time. Such determinations are enabled by a time-based collection of load data and other features, as performed by the access nodes themselves, or an EMS server as described above.

Once the optimal candidate donor node is selected, a probe may be transmitted in 605 to the optimal donor access node to confirm that it is available for a connection. For example, the probe may use a unique identifier such as a C-RNTI in an LTE system. The access node can identify the wireless device and confirm scheduling and connection details that are required by the relay wireless device to function as a relay, such as a specific duration of time for connections, periodic exchange of packets, etc. If the probe yields a positive confirmation, the wireless device can disconnect from the first access node and connect to the optimal donor access node. In an exemplary embodiment, the probe operation uses signals including receiving a 'Setup' message from the optimal donor access node to include 'Relay Backhaul status flag', 'Duration of configuration' in addition to the standard parameter exchange to negotiate backhaul requirements. The relay wireless device can respond with the required information and, after the required information exchange is complete and the backhaul status is confirmed, the access node can configure appropriate policies to serve the relay wireless device. It should be noted that in situations where the first access node is determined to be the optimal donor access node, no probe or handover may be necessary. Instead, a connection is initiated.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, relay wireless device 130, and/or network controller node/EMS 104.

Figure 7:
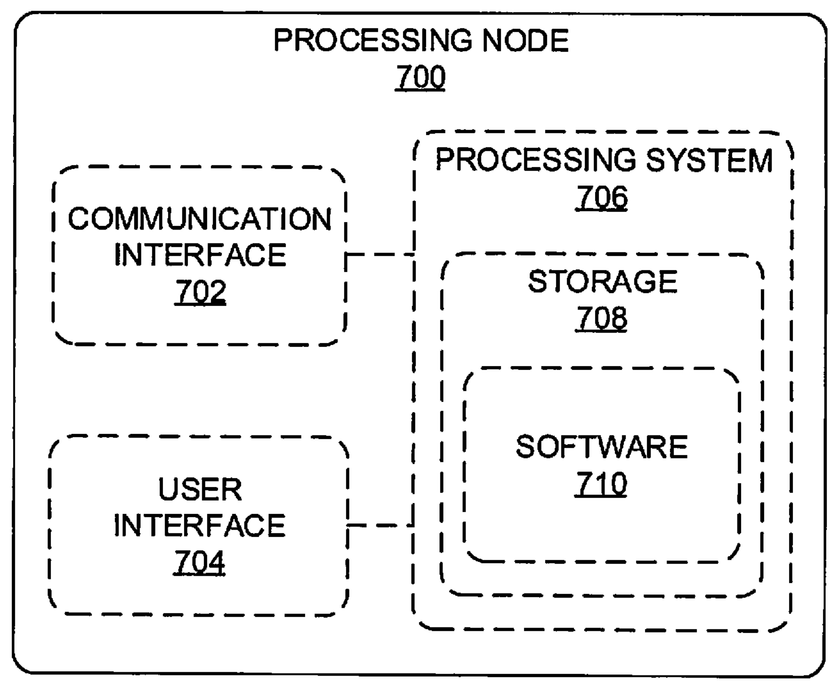
FIG. 7 depicts an exemplary processing node.

FIG. 7 depicts an exemplary processing node 700 comprising communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a call admission control module. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for access node selection in a wireless network, the method comprising:

receiving, at a first donor macro access node, an indication of a relay status from a wireless relay device, the indication of relay status comprising at least one usage requirement of a plurality of end-user wireless devices requesting relayed services from the wireless relay device;

identifying, by the first donor macro access node, one or more neighboring macro access nodes that can satisfy the at least one usage requirement, wherein the first donor macro access node is included in said one or more neighboring macro access nodes;

determining, by the first donor macro access node, an optimal donor macro access node from the one or more neighboring macro access nodes based on a comparison of a plurality of features of each of said one or more neighboring macro access nodes with the least one usage requirement; and performing, by the first donor macro access node, a handover of the wireless relay device to the optimal donor macro access node.

2. The method of claim 1, further comprising obtaining the plurality of features from a network server.

3. The method of claim 2, wherein the plurality of features are periodically pushed from the network server to the first donor macro access node.

4. The method of claim 2, further comprising requesting the plurality of features from the network server.

5. The method of claim 4, wherein the requesting is based on a set of measurements transmitted from the wireless relay device.

6. The method of claim 1, wherein identifying said one or more neighboring macro access nodes further comprises transmitting to the wireless relay device an instruction to report signal measurements of a plurality of detected macro access nodes, and discarding any macro access node that does not satisfy said at least one usage requirement.

7. The method of claim 1, wherein identifying said one or more neighboring macro access nodes further comprises requesting the plurality of features of each of said one or more neighboring macro access nodes directly from said one or more neighboring macro access nodes.

8. The method of claim 7, wherein requesting the plurality of features is performed via a direct connection between the macro access nodes.

9. The method of claim 1, wherein the plurality of features comprises one or more of a frequency band, a carrier-aggregation capability, or a throughput.

10. The method of claim 9, wherein the optimal donor macro access node is determined based on a highest-possible throughput.

11. The method of claim 1, wherein the plurality of features is obtained for a time of day, the method further comprising determining an average throughput for each of said one or more neighboring macro access nodes for the time of day over a period of days.

12. The method of claim 11, further comprising determining the optimal donor macro access node based on the average throughput for the time of day.

13. The method of claim 12, wherein the determination of the optimal donor macro access node varies based on different average throughputs at different times of day.

14. A system for access node selection in a wireless network, the system comprising:

a first donor macro access node in wireless communication with at least one wireless relay device; and a processor communicatively coupled to the first donor macro access node, the processor for configuring the first donor macro access node to execute operations comprising:

matching a plurality of features of each of a plurality of candidate donor macro access nodes with at least one usage requirement of a plurality of end-user wireless devices requesting relayed service from the wireless relay device;

based on the matching, determining an optimal donor macro access node from among the plurality of candidate donor macro access nodes for offering service to the wireless relay device; and performing a handover of the wireless device;

wherein the wireless relay device acts as a relay for relaying services from the optimal donor macro access node to a plurality of end-user wireless devices.

15. The system of claim 14, wherein the operations further comprise retrieving the plurality of features directly from each of the plurality of candidate donor macro access nodes.

16. The system of claim 14, wherein the operations further comprise retrieving the plurality of features from a network node that is communicatively coupled to each of the plurality of candidate donor macro access nodes.

17. A donor macro access node in a wireless network, the donor macro access node comprising a processor for enabling the donor macro access node to perform operations comprising:

receiving a request indicating a relay status from a relay access node attached to the donor access node, the request including a usage requirement of a plurality of end-user wireless devices requesting relayed services from the relay access node;

transmitting an instruction from the donor macro access node to measure signal characteristics of each of a plurality of candidate donor macro access nodes;

receiving the measured signal characteristics of each of the plurality of candidate donor macro access nodes at the donor access node;

matching the measured signal characteristics with the usage requirement of the plurality of end-user wireless devices; and performing a handover of the relay access node based on matching the measured signal characteristics with the at least one usage requirement.

18. The donor macro access node of claim 17, wherein the at least one usage requirement includes one or more of a throughput requirement, a frequency band, or a carrier aggregation capability.

* * * * *